(12) United States Patent
Kim et al.

(10) Patent No.: US 11,112,629 B2
(45) Date of Patent: Sep. 7, 2021

(54) DISPLAY APPARATUS HAVING A DURABLE FLEXIBLE CIRCUIT BOARD ARRANGEMENT

(71) Applicant: SAMSUNG DISPLAY CO., LTD., Yongin-si (KR)

(72) Inventors: Tae-Chang Kim, Anyang-si (KR); Myunghun Baek, Suwon-si (KR); Jae-Hwan Jeon, Asan-si (KR); Giyoung Kang, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 284 days.

(21) Appl. No.: 16/430,039

(22) Filed: Jun. 3, 2019

(65) Prior Publication Data
US 2020/0012142 A1  Jan. 9, 2020

(30) Foreign Application Priority Data
Jul. 6, 2018 (KR) .......................... 10-2018-0078999

(51) Int. Cl.
*G02F 1/1333* (2006.01)

(52) U.S. Cl.
CPC .. *G02F 1/133305* (2013.01); *G02F 1/133308* (2013.01); *G02F 1/13332* (2021.01); *G02F 1/133317* (2021.01)

(58) Field of Classification Search
CPC ......... G02F 1/133305; G02F 1/133308; G02F 1/133317; G02F 1/13332
USPC ........................................................... 349/58
See application file for complete search history.

(56) References Cited

U.S. PATENT DOCUMENTS

| | | | |
|---|---|---|---|
| 9,516,771 B2 | 12/2016 | Byeon | |
| 9,766,760 B2 | 9/2017 | Jeon et al. | |
| 10,070,538 B2 | 9/2018 | Park et al. | |
| 2016/0282652 A1* | 9/2016 | Kuk | G02F 1/13338 |
| 2017/0359890 A1 | 12/2017 | Park et al. | |

FOREIGN PATENT DOCUMENTS

| | | |
|---|---|---|
| KR | 10-2015-0103783 | 9/2015 |
| KR | 10-2015-0145152 | 12/2015 |
| KR | 10-1710188 | 2/2017 |

* cited by examiner

*Primary Examiner* — Nathanael R Briggs
*Assistant Examiner* — William D Peterson
(74) *Attorney, Agent, or Firm* — F. Chau & Associates, LLC

(57) ABSTRACT

A display apparatus includes a display panel configured to display an image. A first mold is disposed under the display panel and includes a plurality of sidewall portions. A second mold is disposed adjacent to one of the sidewall portions and is coupled to the first mold. At least one flexible circuit board is connected to the display panel and is disposed between the first and second molds. The second mold includes a bottom mold covering one edge area of a bottom surface of the first mold. A cover mold covers the one sidewall portion of the first mold. A first distance between an inner side surface of the cover mold and an outer side surface of the one sidewall portion of the first mold is substantially constant.

34 Claims, 9 Drawing Sheets

– 1 –

DISPLAY APPARATUS HAVING A DURABLE FLEXIBLE CIRCUIT BOARD ARRANGEMENT

CROSS-REFERENCE TO RELATED APPLICATION

This U.S. non-provisional patent application claims priority under 35 U.S.C. § 119 to Korean Patent Application No. 10-2018-0078999, filed on Jul. 6, 2018, the entire contents of which are hereby incorporated by reference.

TECHNICAL FIELD

The present disclosure relates to a display apparatus, and more particularly, to a display apparatus having a durable flexible circuit board arrangement.

DISCUSSION OF THE RELATED ART

Display apparatuses are in common use today across a wide variety of electronic products. A display apparatus may include a plurality of pixels for displaying an image. Each pixel may include one or more thin film transistors disposed therein. These thin film transistors may be configured to turn each pixel on and off.

A display apparatus may include a display panel, a backlight unit for providing light to the display panel, and a housing for encasing the display panel and the backlight unit. The backlight unit may include a light source and a light guide plate. Light generated from the light source may be guided in the light guide plate so as to be provided to the display panel.

The housing may protect the display panel and the backlight unit from physical damage.

SUMMARY

A display apparatus includes a display panel configured to display an image. A first mold is disposed under the display panel and includes a plurality of sidewall portions. A second mold is disposed adjacent to one of the plurality of sidewall portions and is coupled to the first mold. At least one flexible circuit board is connected to the display panel. A portion of the at least one flexible circuit board is bent downward. The at least one flexible circuit board is disposed between the first mold and the second mold. The second mold includes a bottom mold at least partially covering one edge area of a bottom surface of the first mold. A cover mold is bent upward from the bottom mold to cover the one sidewall portion. A first distance between an inner side surface of the cover mold and an outer side surface of the one sidewall portion of the plurality of sidewall portions is substantially constant across an entirety thereof.

A display apparatus includes a display panel configured to display art image. At least one flexible circuit board id connected to the display panel. A backlight unit is disposed under the display panel. A first mold accommodates the backlight unit. A second mold is disposed adjacent to at least one outer side surface of the first mold. At least a portion of the flexible circuit board is bent downward and is disposed between the at least one outer side surface of the first mold and an inner side surface of the second mold which faces the at least one outer side surface the first mold. A distance between the at least one outer side surface of the first mold and the inner side surface of the second mold is substantially constant across an entirety thereof.

– 2 –

A display apparatus includes a display panel configured to display an image. A first mold is disposed under the display panel and includes a plurality of sidewall portions. The display panel is seated on the first mold. At least one flexible circuit board which is connected to the display panel and of which a portion is bent downward to at least partially surround one of the plurality of sidewall portions. A second mold is disposed outside of the first mold and is coupled to the first mold with the flexible circuit board interposed therebetween. The second mold includes a first surface facing an outer side surface of the one of the plurality of sidewall portions and parallel to the outer side surface. A second surface has a round shape which is outwardly convex.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings.

DETAILED DESCRIPTION OF THE EMBODIMENTS

Figure 1:
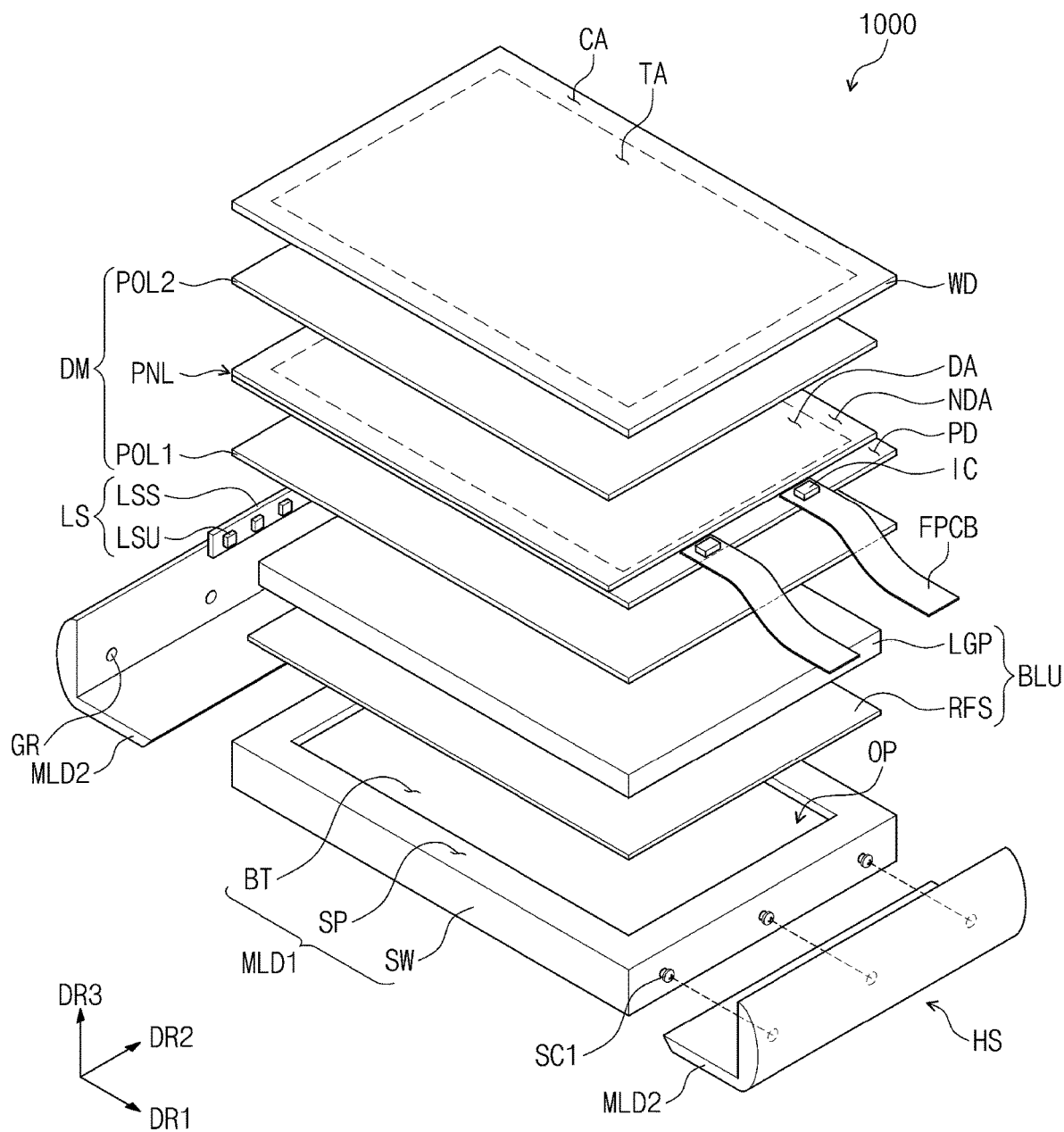
FIG. 1 is an exploded perspective view illustrating a display apparatus according to an exemplary embodiment of the present inventive concepts.

The inventive concepts now will be described more fully hereinafter with reference to the accompanying drawings, in which various exemplary embodiments are shown. The inventive concepts may, however, be embodied in many different forms, and should not be construed a limited to the embodiments set forth herein. Rather, these embodiments are provided so that this disclosure will be thorough and complete, and will fully convey the scopes of the inventive concepts to those skilled in the art. Like reference numerals may refer to like elements throughout the specification and drawings.

It will be understood that when an element such as a layer, region or substrate is referred to as being "on" another element, it can be directly on the other element or intervening elements may be present.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g. rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Hereinafter, exemplary embodiments of the inventive concepts will be described in detail with reference to the accompanying drawings.

Figure 2:
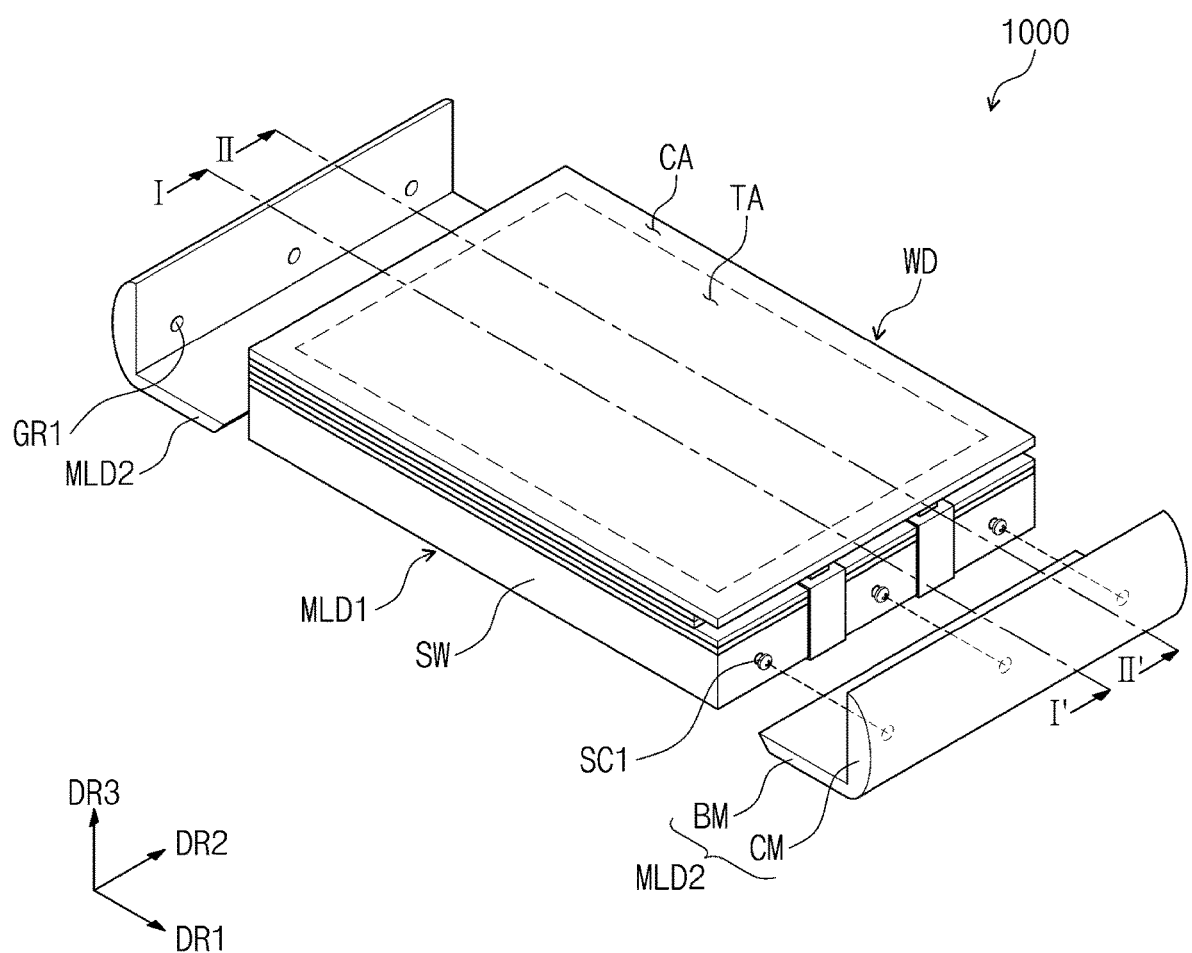
FIG. 2 is a perspective view illustrating an assembled state of the display apparatus of FIG. 1.

FIG. 1 is an exploded perspective view illustrating a display apparatus according to an exemplary embodiment of the present inventive concepts, and FIG. 2 is a perspective view illustrating an assembled state of the display apparatus of FIG. 1.

Referring to FIGS. 1 and 2, a display apparatus 1000, according to an exemplary embodiment of the present inventive concepts may have a substantially rectangular shape that has a pair of long sides extending primarily in a first direction DR1 and a pair of short sides extending primarily in a second direction DR2. However, exemplary embodiments of the present inventive concepts are not limited thereto. In other embodiments, the shape of the display apparatus 1000 may be variously modified.

For the purpose of ease and convenience in description, in the display apparatus 1000, a direction in which an image is provided may be defined as an upward direction (e.g. out of the face of the display device), and a direction opposite to the upward direction may be defined as a downward direction. In the present embodiment, the upward and downward directions may be parallel to a third direction DR3 and perpendicular to the first direction DR1 and the second direction DR2. The third direction DR3 may be a reference direction used to define a front surface and a rear surface of each of components to be described later. However, the upward and downward directions may be relative concepts and may be changed into other directions.

The display apparatus 1000 may include a cover member, a display module DM, at least one flexible printed circuit board FPCB, a backlight unit BLU, and a housing HS.

The cover member may be disposed at a top of the display apparatus 1000 and may be configured to protect the display module DM. In the present exemplary embodiment, the cover member may be an at least partially transparent window WD.

The window WD may include a light transmitting portion TA which transmits an image provided from the display module DM, and a light blocking portion CA which is adjacent to the light transmitting portion TA and blocks the image. The light blocking portion CA may at least partially surround the light transmitting portion TA. The light transmitting portion TA may be disposed in a central portion of the display apparatus 1000 when viewed in a plan view defined by the first direction DR1 and the second direction DR2. The light blocking portion CA may be disposed to fully surround the light transmitting portion TA and may have a frame shape. However, exemplary embodiments of the inventive concepts are not limited to these shapes of the light transmitting portion TA and the light blocking portion CA. For example, according to an exemplary embodiment of the present inventive concepts, the window WD may include only the light transmitting portion TA. Accordingly, the light blocking portion CA may be omitted.

The display module DM may be disposed under the window WD. The display module DM may display an image by using light provided from the backlight unit BLU. For example, the display module DM may include a light receiving type display panel. For example, the display module DM may include a liquid crystal display panel. However, exemplary embodiments of the present inventive concepts are not limited to the kind of the display panel included in the display module DM. For example, the display module DM may include an organic light emitting diode (OLED) display panel, in this case, the backlight unit BLU may be omitted as the OLED display panel may generate its own light as it displays an image.

When viewed in a plan view, a surface of the display module DM on which an image is displayed may be defined as a display surface. The display surface may include a display area DA, on which an image is displayed, and a non-display area NDA, on which an image is not displayed. The display area DA may be defined in a central portion of the display module DM when viewed in a plan view. The display area DA may substantially coincide and align with the light transmitting portion TA of the window WD. The non-display area NDA may have a frame shape at least partially surrounding the display area DA. The non-display area NDA may substantially coincide and align with the light blocking portion CA of the window WD when viewed in a plan view.

The display module DM may include a first polarizing layer POL1, a display panel PNL, and a second polarizing layer POL2. The display panel PNL may be disposed between the first polarizing layer POL1 and the second polarizing layer POL2. These will be described later in more detail with reference to FIG. 3.

The non-display area NDA may include a pad area PD defined on the display panel PNL. The pad area PD may be adjacent to one side of the display panel PNL in the first direction DR1. Signal lines for driving the display panel PNL of the display module DM may be formed in the pad area PD. According to an exemplary embodiment of the present inventive concept, driving elements for driving the display panel PNL may be mounted on the pad area PD.

The flexible circuit board FPCB may be connected to the display panel PNL. For example, one end of the flexible circuit board FPCB may be connected to the pad area PD of the display panel PNL.

The flexible circuit board FPCB may be flexible. In this context, the term "flexible" is intended to mean having an ability to be bent or otherwise flexed to a non-trivial degree without cracking or breaking. Thus, the flexible circuit board FPCB may be bent to extend in a downward direction of the display panel PNL. The extending portion of the flexible circuit board FPCB may at least partially surround a portion of the housing HS to be described later in detail.

According to exemplary embodiments of the present inventive concept, the flexible circuit board FPCB may be provided in plural. The plurality of flexible circuit boards FPCB may be arranged and spaced apart from each other in the second direction DR2. Two flexible circuit boards FPCB are illustrated in FIGS. 1 and 2. However, exemplary embodiments of the present inventive concepts are not limited to the number of the flexible circuit board(s) FPCB.

The display apparatus 1000, according, to exemplary embodiments of the present inventive concept, may further include at least one driving chip IC mounted on the flexible circuit board FPCB. The driving chip IC may include a driving circuit device configured for driving the display panel PNL. The driving chip IC may be mounted on a portion of the flexible circuit board FPCB which is connected to the pad area PD.

The backlight unit BLU may be disposed under the display module DM and may provide light toward the display module DM. According to exemplary embodiments of the present inventive concept, the backlight unit BLU may be an edge type backlight unit. However, the present inventive concepts are not limited thereto. For example, the backlight unit BLU may be a direct type backlight unit.

The backlight unit BLU, according to exemplary embodiments of the present inventive concept, may include a light source LS, a light guide plate or member LGP, and a reflective member or reflector RFS.

The light source LS may be disposed adjacent to one side surface of the light guide member LGP in the first direction DR1. However, the present invention is not limited by the position of the light source LS. In some exemplary embodiments of the present inventive concept, the light source LS may be disposed adjacent to at least one of the side surfaces of the light guide member LGP.

The light source LS may include a plurality of light source units LSU and a light source board LSS.

The light source units LSU may generate light to be provided to the display module DM and may provide the generated light to the light guide member LGP. The light source units LSU may be arranged in the second direction DR2.

According to, exemplary embodiments of the present inventive concept, each of the light source units LSU may include a light emitting diode (LED) used as a point light source. However, the present invention is not limited by the kind of the light source units LSU.

In addition, the present invention is not limited by the number of the light source units LSU. For example, a single light source unit LSU including the LED may be provided as a point light source, or the light source units LSU may be provided as a plurality of LED groups. Alternatively, the light source unit LSU may be a linear light source.

The light source units LSU may be mounted on the light source board LSS. The light source board LSS may be disposed to face the one side surface of the light guide member LGP and may extend in the second direction DR2.

The light guide member LGP may be disposed under the display module DM. The light guide member LGP may include a material which has a high light transmittance in a visible light wavelength band. For example, the light guide member LGP may include a glass material. Alternatively, for example, the light guide member LGP may be formed of a transparent polymer resin such as polymethyl methacrylate (PMMA).

The light guide member LGP may include a plurality of light exiting patterns formed on a bottom surface or a top surface of the light guide member LGP. The light exiting patterns may refract light incident on the bottom surface or the top surface of the light guide member LGP to change a reflection angle of the light.

The reflective member RFS may be disposed under the light guide member LGP. The reflective member RFS may reflect light exiting from the bottom surface of the light guide member LGP in the upward direction. The reflective member RFS may include a material capable of reflecting light. For example, the reflective member RFS may include aluminum or silver.

The backlight unit BLU may further include an optical member disposed between the light guide member LGP and the display module DM. The optical member may concentrate and/or diffuse light provided horn the light guide member LGP and may provide the concentrated and/or diffused light to the display module DM. The optical member may include a plurality of sheets. The plurality of sheets may include a diffusion sheet, a prism sheet, and a protective sheet. The diffusion sheet may diffuse the light provided from the light guide member LGP. The prism sheet may be disposed on the diffusion sheet and may concentrate the light diffused by the diffusion sheet in the upward direction. The protective sheet may protect prisms of the prism sheet from external friction. However, the present invention id not limited by the kinds and the number of components (e.g., the sheets) included in the optical member. For example, the optical member may be omitted.

The housing HS may be disposed at a bottom of the display apparatus 1000. The housing HS may include a first mold MLD1 and at least one second mold MLD2. The first mold MLD1 and the second mold MLD2 may be coupled to each other to constitute a single body shape.

The first mold MLD1 may receive the backlight unit BLU. The first mold MLD1 may include a bottom portion BT, a support portion SP, and a plurality of sidewall portions SW linking the bottom portion BT and the support portion SP. The backlight unit BLU may be disposed between the bottom portion BT and the support portion SP. The sidewall portions SW may be disposed to at least partially surround the backlight unit BLU when viewed in a plan view. The sidewall portions SW may define an outer circumferential surface of the first mold MLD1 in a plan view.

The second mold MLD2 may be disposed outside of the first mold MLD1. The second mold MLD2 may be disposed adjacent to one of the sidewall portions SW of the first mold MLD1. For example, the second mold MLD2 may be disposed adjacent to at least one of the sidewall portions SW which extend in the second direction DR2 and are opposite to each other in the first direction DR1.

The one sidewall portion SW adjacent to the second mold MLD2 may be adjacent to the flexible circuit board FPCB described above. This will be described later in more detail with reference to FIGS. 4 to 6.

The second mold MLD2 may extend in the extending direction of the sidewall portion SW adjacent to the second mold MLD2. For example, the second mold MLD2 may extend in the second direction DR2.

The second mold MLD2 may include a bottom mold BM and a cover mold CM. The bottom mold BM may be disposed under the first mold MLD1. The bottom mold BM may have a plate shape extending in the second direction DR2. The bottom mold BM may at least partially cover one edge area of the bottom portion BT of the first mold MLD1 when viewed in a plan view. The one edge area may be adjacent to one side of the bottom portion BT in the first direction DR1.

The cover mold CM may be bent from an end of the bottom mold BM and may extend in the upward direction. The cover mold CM may extend in parallel to the one sidewall portion SW of the first mold MLD1 when viewed in a plan view. The cover mold CM may cover the one sidewall portion SW of the first mold MLD1, an outer side surface of the display module DM, and an outer side surface of the cover member WD. For example, the cover mold CM may define a portion of an outer side surface of the display apparatus 1000.

According to an exemplary embodiment of the present inventive concept, the second mold MLD2 may be provided in plural. For example, as illustrated in FIGS. 1 and 2, two second molds MLD2 may be disposed to correspond to both sides of the first mold MLD1 in the first direction DR1, respectively. For example, the second molds MLD2 may be opposite to each other in the first direction DR1 with the first mold MLD1 interposed therebetween. For example, the second mold MLD2 may be additionally disposed outside at least one of other sidewall portions SW in addition to the one sidewall portion SW adjacent to one side of the display module DM on which the flexible circuit board FPCB is disposed.

Figure 4:
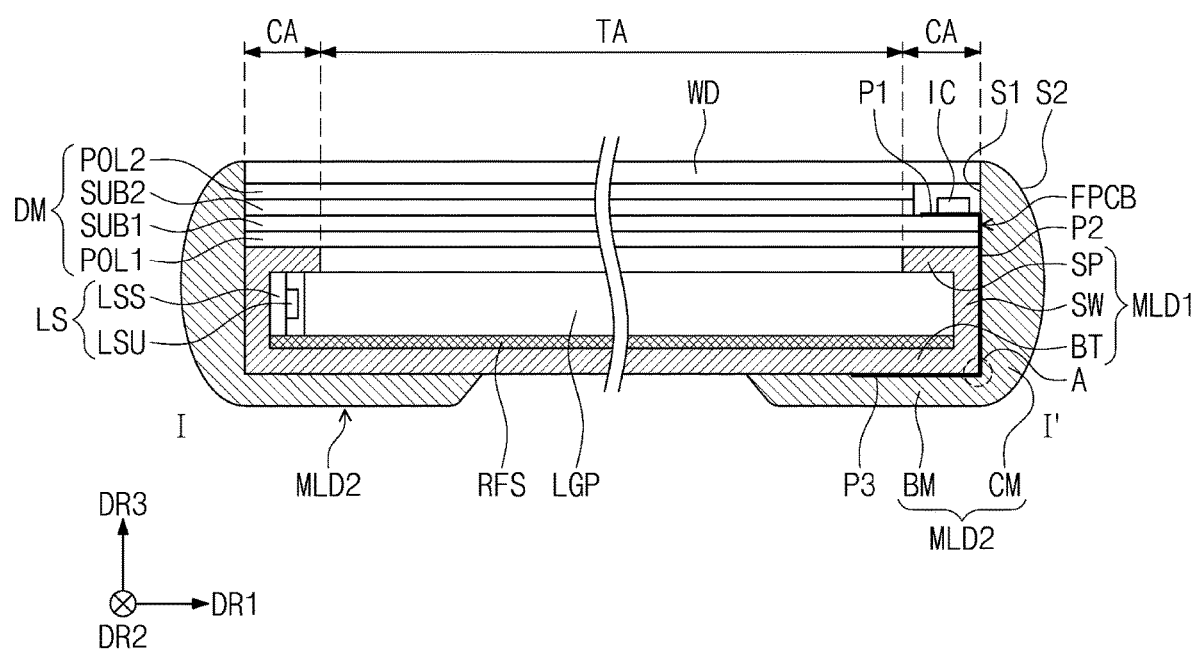
FIG. 4 is a cross-sectional view taken along a line I-I' of FIG. 2.
Figure 5:
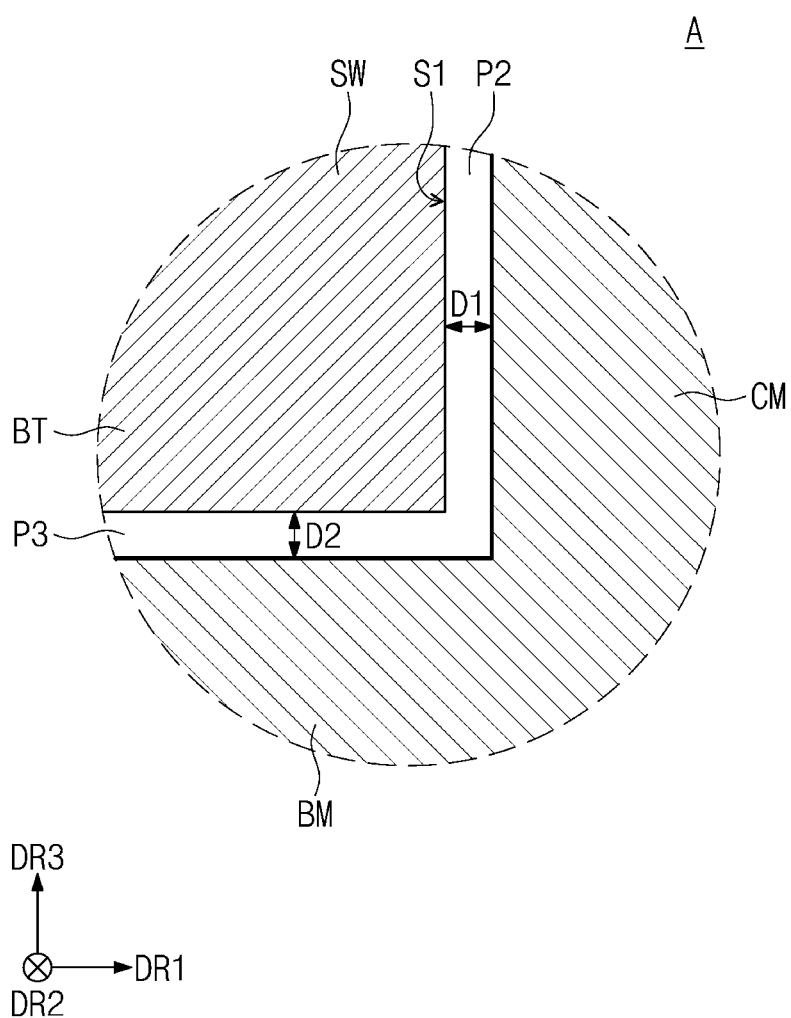
FIG. 5 is an enlarged view of a portion 'A' of FIG. 4.

According to exemplary embodiments of the present inventive concept, at least one flexible circuit board FPCB may be disposed between the first mold MLD1 and the second mold MLD2. This will be described later in more detail with reference to FIGS. 4 and 5, FIG. 3 is an enlarged cross-sectional view illustrating a display module of FIG. 1.

Figure 3:
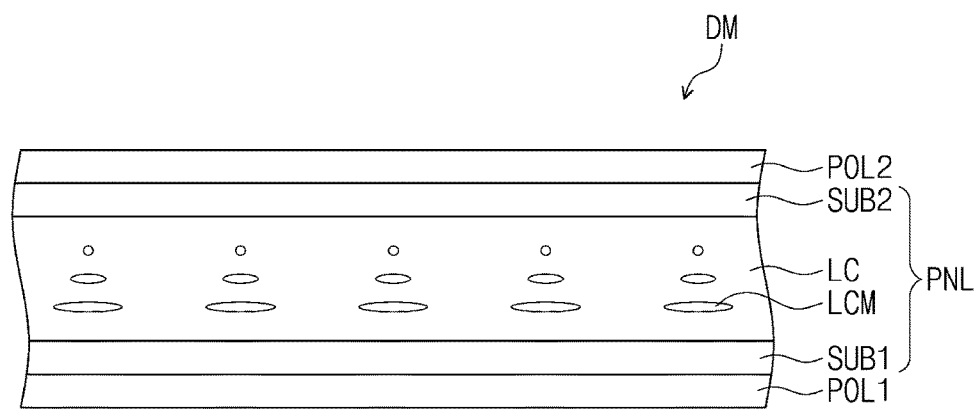
FIG. 3 is an enlarged cross-sectional view illustrating a display module of FIG. 1.

Referring to FIG. 3, the display module DM may include the first polarizing layer POL1, the display panel PNL, and the second polarizing layer POL2, as described above. The first polarizing layer POL1 may be disposed between the display panel PNL and the backlight unit BLU to polarize components of light provided from the backlight unit BLU. The first polarizing layer POL1 may have a transmission axis extending in a predetermined direction.

The display panel PNL may be disposed on the first polarizing layer POL1 to display an image through the display area DA (see FIG. 1). As described above, the display panel PNL may be a light receiving type display panel. For example, the display panel PNL may be a liquid crystal display panel.

In detail, the display panel PNL may include a first substrate SUB1, a second substrate SUB2, and a liquid crystal layer LC.

The first substrate SUB1 may be disposed on the first polarizing layer POL1. The first substrate SUB1 may be formed of a material having a high light transmittance to easily transmit light provided from the backlight unit BLU. For example, the first substrate SUB1 may be a transparent substrate, a transparent plastic substrate, or a transparent film.

At least one pixel area and a non-pixel area adjacent to the pixel area may be defined on the first substrate SUB1 when viewed in a plan view. For example, the pixel area may be provided in plural, and the non-pixel area may be defined between the pixel areas.

Pixels may be disposed on the pixel areas of the first substrate SUB1, respectively. The pixels may include a plurality of pixel electrodes and a plurality of thin film transistors electrically connected to the pixel electrodes in one-to-one correspondence. Each of the thin film transistors may be connected to each of the pixel electrodes to switch a driving signal provided to each of the pixel electrodes.

The second substrate SUB2 may be disposed over the first substrate SUB1 and may face the first substrate SUB1. The liquid crystal layer LC may be disposed between the second substrate SUB2 and the first substrate SUB1. The liquid crystal layer LC may include a plurality of liquid crystal molecules LCM arranged in a predetermined direction.

The second substrate SUB2 may include a common electrode which is configured to form an electric field with the pixel electrodes. The electric field may control arrangement and/or alignment of the liquid crystal molecules LCM. The display module DM may drive the liquid crystal layer LC to display an image in the third direction DR3 corresponding to the upward direction.

The second polarizing layer POL2 may be disposed on the second substrate SUB2. However, the present invention is not limited by the position of the second polarizing layer POL2 illustrated in FIG. 3. For example, the second polarizing layer POL2 may be disposed under the second substrate SUB2. For example, the second polarizing layer POL2 may be disposed in the display panel PNL. According to an exemplary embodiment of the present inventive concept, the second polarizing layer POL2 may be coupled to the window WD of FIGS. 1 and 2 as a single body shape. According to an exemplary embodiment of the present inventive concept, the second polarizing layer POL2 may perform the function of the window WD of FIGS. 1 and 2. In this case, the window WD may be omitted. For example, the cover member may be the second polarizing layer POL2.

The second polarizing layer POL2 may have an absorption axis extending in a predetermined direction. When a display mode of the display apparatus 1000 is in a bright state, the second polarizing layer POL2 may transmit light. When the display mode of the display apparatus 1000 is in a dark state, the second polarizing layer POL2 may absorb light.

According to an exemplary embodiment of the present inventive concept, an angle between the transmission axis of the first polarizing layer POL1 and the absorption axis of the second polarizing layer POL2 may be set depending on an arrangement mode of the liquid crystal molecules LCM. For example, the transmission axis of the first polarizing layer POL1 may be perpendicular to the absorption axis of the second polarizing layer POL2 when viewed in a plan view.

Figure 6:
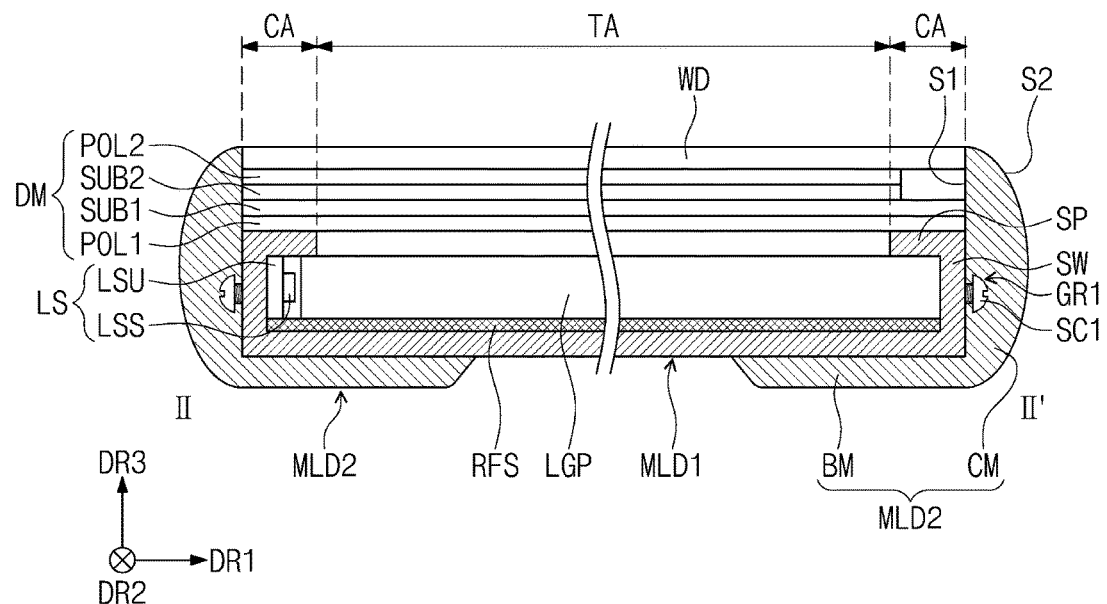
FIG. 6 is a cross-sectional view taken along a line II-II' of FIG. 2.

FIG. 4 is a cross-sectional view taken along a line I-I' of FIG. 2, and FIG. 5 is an enlarged view of a portion 'A' of FIG. 4. FIG. 6 is a cross-sectional view taken along a line II-II' of FIG. 2.

Referring to FIGS. 4 to 6, the first mold MLD1 may include the bottom portion BT, the support portion SP, and the plurality of sidewall portions SW, as described above. For example, the first mold MLD1 may include a plastic material and/or a metal material.

The bottom portion BT may have a plate shape. The bottom portion BT may define a bottom surface of the first mold MLD1. The backlight unit BLU may be disposed on the bottom portion BT.

The support portion SP may have a frame shape. An opening OP (see FIG. 1) may be defined in the first mold MLD1 by the support portion SP. The light guide member LGP of the backlight unit BLU may be exposed through the opening OP. The support portion SP may be parallel to the bottom portion BT. The support portion SP may align with and overlap with an edge area of the bottom portion BT when viewed in a plan view. The display module DM may be disposed on the support portion SP.

The sidewall portions SW may link or connect the bottom portion BT and the support portion SP to each other. The sidewall portions SW may be connected to each other to define the outer circumferential surface of the first mold MLD1 in a plan view. The sidewall portions SW may define a height of the first mold MLD1 in the third direction DR3.

As described above, the second mold MLD2 may be disposed adjacent to an outer surface of the first mold MLD1. The second mold MLD2 may include the same material as the first mold MLD1. For example, the second mold MLD2 may include a plastic material or a metal material.

The bottom mold BM of the second mold MLD2 may cover a portion of the bottom portion BT of the first mold MLD1. A top surface of the bottom mold BM may face a rear surface of the bottom portion BT of the first mold MLD1.

The cover mold CM of the second mold MLD2 may include a first surface S1 defined as an inner side surface and a second surface S2 defined as an outer side surface. The first surface S1 may face an outer side surface of the one sidewall portion SW of the first mold MLD1. According to an exemplary embodiment of the present inventive concept, the first surface S1 may cover side surfaces of the one sidewall portion SW of the first mold MLD1, the display module DM and the cover member WD. For example, the first surface S1 may be parallel to the one sidewall portion SW.

The second surface S2 may define a portion of an outer surface of the housing HS. The second surface S2 may be connected to a top surface of the cover member WD. According to an exemplary embodiment of the present inventive concept, the second surface S2 may have a round shape which is convex toward the outside of the housing HS in the first direction DR1. Thus, when a user grips the display apparatus 1000, excellent grip feeling may be provided to the user. In addition, since a side surface of the display apparatus 1000 includes the round surface, the display apparatus 1000 may have greater aesthetic appeal.

The first surface S1 and the second surface S2 may be connected to each other at a top of the cover mold CM.

According to an exemplary embodiment of the present inventive concept, each of the flexible circuit boards FPCB may be bendable or foldable due to its flexibility. For example, each of the flexible circuit boards FPCB may include a first portion P1, a second portion P2, and a third portion P3. The first portion P1 may be disposed on the pad area PD of the display panel PNL. The first portion P1 may be parallel to the display panel PNL. For example, the driving chip IC may be disposed on the first portion P1.

The second portion P2 may be disposed adjacent to the first portion P1. The second portion P2 may extend in the downward direction. For example, the second portion P2 may be connected to an end of the first portion P1 and may be bent downward from the end of the first portion P1. The second portion P2 may cover a portion of the sidewall portion SW of the first mold MLD1.

The third portion P3 may be disposed adjacent to the second portion P2. According to an exemplary embodiment of the present inventive concept, the third portion P3 may extend in parallel to the first portion P1. At least a portion of the third portion P3 may overlap with the first portion P1 when viewed in a plan view. For example, the third portion P3 may be bent from a bottom end of the second portion P2 in a direction toward the inside of the display apparatus 1000. The third portion P3 may cover a portion of a bottom surface of the bottom portion BT.

For example, the first portion P1 is connected directly to the second portion P2, and the second portion P2 is connected directly to the third portion P3. However, the present invention is not limited thereto. For example, portions extending in other directions may be additionally defined between the first portion P1 and the second portion P2 and between the second portion P2 and the third portion P3.

According to an exemplary embodiment of the present inventive concept, the flexible circuit boards FPCB may be disposed between the first mold MLD1 and the second mold MLD2, as described above.

For example, be second portion P2 of each of the flexible circuit boards FPCB may be disposed between the outer side surface of the sidewall portion SW of the first mold MLD1 and the first surface S1 of the cover mold CM of the second mold MLD2. The first surface S1 of the cover mold CM may be parallel to the outer side surface of the sidewall portion SW. A distance between the outer side surface of the sidewall portion SW and the first surface S1 of the cover mold CM may be defined as a first distance D1.

According to an exemplary embodiment of the present inventive concept, the first distance D1 may have a substantially constant value. The first distance D1 may be determined depending on a thickness of the flexible circuit board FPCB. For example, the first distance D1 may be about 0.5 mm or less.

When the first distance D1 is substantially equal to the thickness of the flexible circuit board FPCB, one surface of the flexible circuit board FPCB may be in contact with the outer side surface of the sidewall portion SW, and another surface of the flexible circuit board FPCB may be in contact with the first surface S1 of the cover mold CM. However, the first distance D1 may be greater than the thickness of the flexible circuit board FPCB, in consideration of a tolerance in a manufacturing process.

The third portion P3 of the flexible circuit board FPCB may be disposed between the bottom surface of the bottom portion BT of the first mold MLD1 and the top surface of the bottom mold BM of the second mold MLD2. A distance between the bottom surface of the bottom portion BT and the top surface of the bottom mold BM may be defined as a second distance D2.

According to an exemplary embodiment of the present inventive concept, the second distance D2 may have a substantially constant value. The second distance D2 may be determined depending on the thickness of the flexible circuit board FPCB. For example, the second distance D2 may be equal to the first distance D1. For example, the second distance D2 may be about 0.5 mm or less.

When the second distance D2 is substantially equal to the thickness of the flexible circuit board FPCB, one surface of the flexible circuit board FPCB may be in contact with the bottom surface of the bottom portion BT, and another surface of the flexible circuit board FPCB may be in contact with the top surface of the bottom mold BM. However, the second distance D2 may be greater than the thickness of the flexible circuit board FPCB, in consideration of a tolerance in a manufacturing process.

According to an exemplary embodiment of the present inventive concept, since the flexible circuit boards FPCB are disposed between the first mold MLD1 and the second mold MLD2, the flexible circuit boards FPCB may be stably received. For example, the first mold MLD1 and the second mold MLD2 may fix the flexible circuit boards FPCB such that the flexible circuit boards FPCB do not move in a space between the first and second molds MLD1 and MLD2, and thus it is possible to prevent the flexible circuit boards FPCB from being damaged. As a result, the display apparatus 1000 may be made more durable.

According to an exemplary embodiment of the present inventive concept, the display apparatus 1000 may further include at least one first connection member SC1 which couples the first mold MLD1 and the second mold MLD2 to each other. The first connection member SC1 may be disposed between the first mold MLD1 and the second mold MLD2. For example, the first connection member SC1 may be a screw.

In detail, a first connection recess GR1 may be defined to be recessed from the first surface S1 of the cover mold CM of the second mold MLD2 into the inside of the cover mold CM. The first connection member SC1 fixed on the one sidewall portion SW of the first mold MLD1 may be inserted in the first connection recess GR1, and thus the first mold MLD1 and the second mold MLD2 may be coupled to each other.

The first connection member SC1 may be provided in plural. In FIG. 1, the plurality of first connection members SC1 may be arranged in the second direction DR2 on the sidewall portion SW. The first connection members SC1 may be spaced apart from each other. At least one flexible circuit board FPCB may be disposed between the first connection members SC1 adjacent to each other.

According to an exemplary embodiment of the present inventive concept, the first connection member SC1 is disposed between the sidewall portion SW and the cover mold CM. However, the present invention is not limited by the position of the first connection member SC1. For example, the first connection member SC1 may be disposed between the bottom portion BT and the bottom mold BM.

In FIGS. 1, 2 and 4, the first mold MLD1 and the second mold MLD2 may be coupled to each other in a mate-female coupling type by the first connection member SC1 and the first connection recess GR1 formed in the cover mold CM. However, the present invention is not limited by the kind of the first connection member SC1 and the method of coupling the first and second molds MLD1 and MLD2. For example, the method of coupling the first and second molds MLD1 and MLD2 may be variously modified or changed. For example, according to an exemplary embodiment of the present inventive concept, the first connection member SC1 may be an adhesive tape, and the first connection recess GR1 may not be defined in the cover mold CM.

For example, since the first mold MLD1 and the second mold MLD2 are coupled to each other by the first connection member SC1, relative movement between the first mold MLD1 and the second mold MLD2 may be minimized or prevented. For example, the space between the first mold MLD1 and the second mold MLD2 may be stably maintained. As a result, movement of the flexible circuit board FPCB disposed in the space may be minimized, and thus the display apparatus 1000 may be made more durable.

In FIGS. 1 to 6, the second mold MLD2 is additionally disposed outside another sidewall portion SW of the first mold MLD1, on which the flexible circuit board FPCB is not disposed. However, according to an exemplary embodiment of the present inventive concept, the second mold MLD2, which is not adjacent to the flexible circuit, board FPCB, may be omitted.

In addition, in FIGS. 1 to 6, the second molds MLD2 cover both sidewall portions SW of the first mold MLD1 opposite to each other in the first direction DR1 and the outer side surfaces of the display module DM corresponding to the both sidewall portions SW. However, according to an exemplary embodiment of the present inventive concept, additional molds may cover other sidewall portions SW except the both sidewall portions SW and outer side surfaces of the display module DM corresponding to the other sidewall portions SW. Furthermore, the additional mold may be coupled to one of the first and second molds MLD1 and MLD2 to constitute a single body shape.

Figure 7:
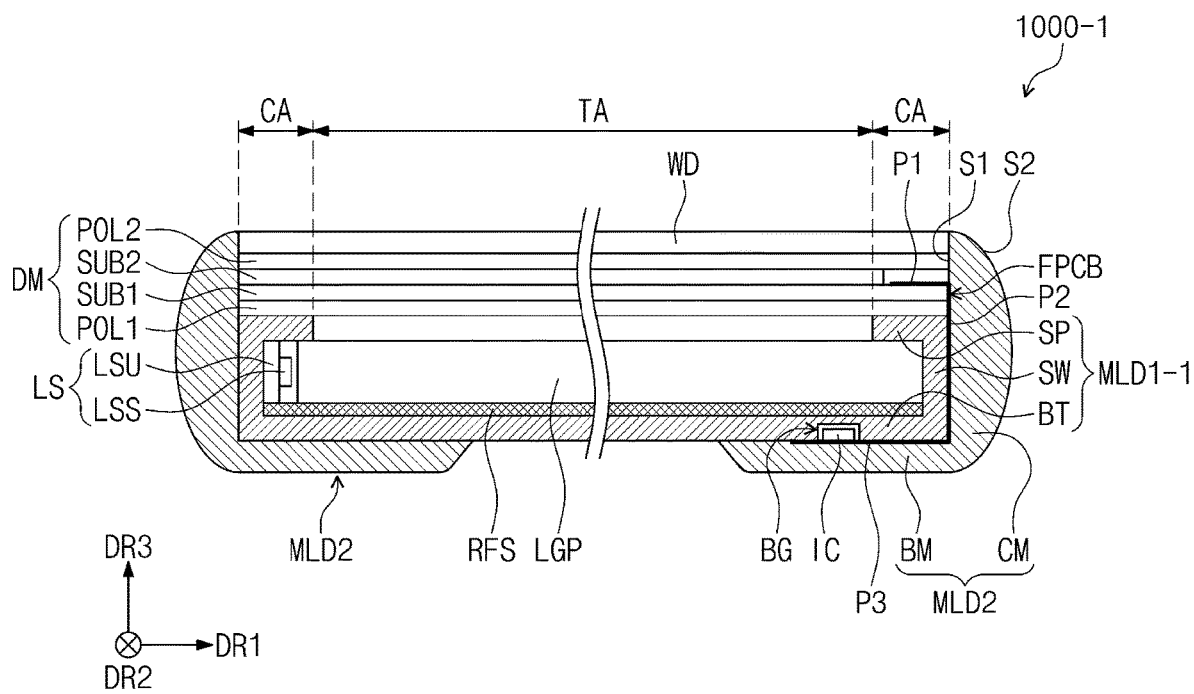
FIG. 7 is a cross-sectional view illustrating a display apparatus according to an exemplary embodiment of the present inventive concepts.

FIG. 7 is a cross-sectional view illustrating a display apparatus according to an exemplary embodiment of the present inventive concepts.

For the purpose of ease and convenience in description, differences between the present embodiment and the above embodiment will be mainly described and the same descriptions as in the above embodiment will be omitted. It is to be understood that the elements for which a detailed description has been omitted may be at least similar to corresponding elements that have already been described. In addition, the same components as described above may be indicated by the same reference designators.

Referring to FIG. 7, a driving chip IC of a display apparatus 1000-1, according to an exemplary embodiment of the present inventive concept, may be disposed on the third portion P3 of the flexible circuit board FPCB.

For example, an insertion recess BG may be defined in a bottom portion BT of a first mold MLD1-1. The insertion recess BG may be recessed from a rear surface (or a bottom surface) of the bottom portion BT in a direction toward the inside of the display apparatus 1000-1 (e.g., in the upward direction). The driving chip IC may be inserted in the insertion recess BG defined in the bottom portion BT.

In FIG. 7, the driving chip IC is mounted on one surface of the third portion P3 of the flexible circuit board FPCB. However, the present invention is not limited thereto. For example, the driving chip IC may be mounted on another surface of the third portion P3, which is opposite to the one surface. In this case, the insertion recess BG may be defined in the bottom mold BM of the second mold MLD2, not the first mold MLD1. For example, the driving chip IC may be mounted on one surface of the second portion P2 of the flexible circuit board FPCB.

According to an exemplary embodiment of the present inventive concept, an area in which the driving chip IC is mounted may be enlarged or increased without a change in size of the display apparatus 1000-1, and thus an integration density of the display apparatus 1000-1 may be easily increased. Since the driving chip IC is inserted in the insertion recess BG, it is possible to inhibit or prevent the driving chip IC from being damaged by external environment and it is possible to prevent the size of the display apparatus 1000-1 from being increased by the driving chip IC.

Figure 8:
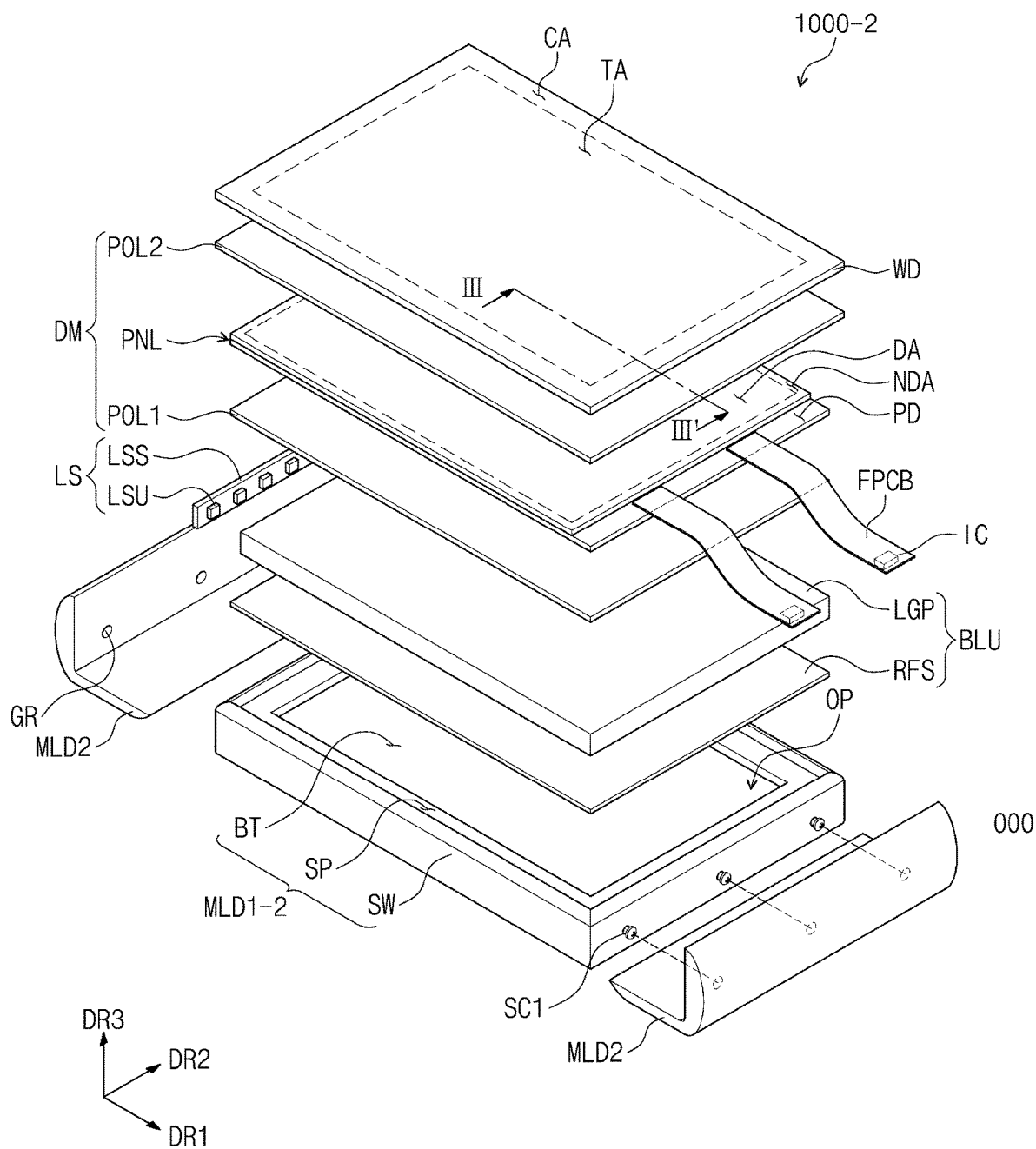
FIG. 8 is an exploded perspective view illustrating a display apparatus according to an exemplary embodiment of the present inventive concepts.
Figure 9:
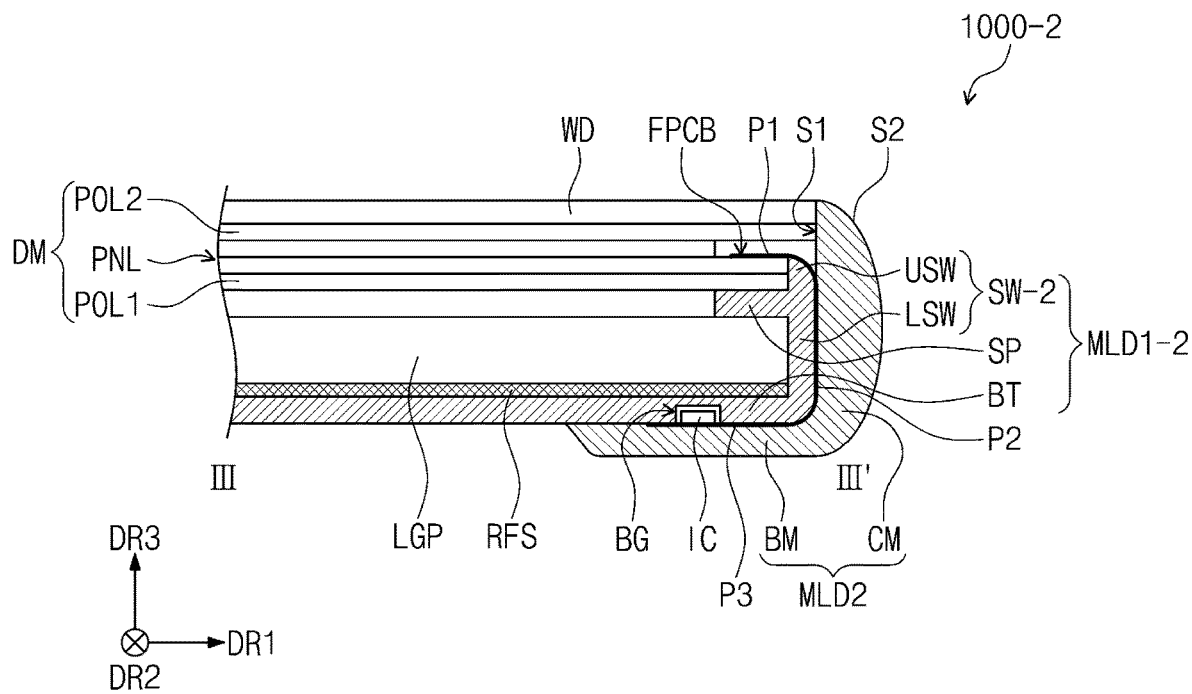
FIG. 9 is a cross-sectional view taken along a line III-III' of FIG. 8.

FIG. 8 is an exploded perspective view illustrating a display apparatus according to an exemplary embodiment of the present inventive concepts, and FIG. 9 is a cross-sectional view taken along a line III-III' of FIG. 8.

For the purpose of ease and convenience in description, differences between the present embodiment and the above embodiments will be mainly described and the same descriptions as in the above embodiments will be omitted. It is to be understood that the elements for which a detailed description has been omitted may be at least similar to corresponding elements that have already been described. In addition, the same components as described above may be indicated by the same reference designators.

Referring to FIGS. 8 and 9, a first mold MLD1-2 of a display apparatus 1000-2 may include a plurality of sidewall portions SW-2. Each of the sidewall portions SW-2 may include a lower sidewall portion LSW and an upper sidewall portion USW. The lower sidewall portion LSW and the upper sidewall portion USW may be connected to each other to constitute a single unitary body shape. The lower sidewall portion LSW and the upper sidewall portion USW may extend in the third direction DR3 when viewed in a cross-sectional view.

The lower sidewall portion LSW may be bent downward from an outer side of the support portion SP and may be connected to the bottom portion BT. The lower sidewall portion LSW may at least partially surround the outer side surface of the backlight unit BLU.

The upper sidewall portion USW may be disposed on the lower sidewall portion LSW. The upper sidewall portion USW may be bent upward from the outer side of the support portion SP. The upper sidewall portion USW may at least partially surround at least a portion of the outer side surface of the display module DM.

According to an exemplary embodiment of the present inventive concepts, a portion of the first mold MLD1-2, which is adjacent to each of bent areas of the flexible circuit board FPCB (e.g., an area between the first and second portions P1 and P2 and an area between the second and third portions P2 and P3), may include a curved surface. For example, the curved surface may be defined in an area between a top surface and an outer side surface of the upper sidewall portion USW of the sidewall portion SW-2, and the curved surface may be defined in an area between an outer side surface of the lower sidewall portion LSW and the bottom surface of the bottom portion BT. In this case, a curved surface may also be defined in an area between the inner side surface (e.g., the first surface S1) of the cover mold CM and the top surface of the bottom mold BM, which are coupled to the first mold MLD1-2.

According to exemplary embodiments of the present inventive concept, the curved surface may be defined on the portion of the first mold MLD1-2 which is adjacent to the bent portion of the flexible circuit board FPCB, and thus stress caused by bending the flexible circuit board FPCB may be reduced. As a result, the display apparatus 1000-2 may be made more durable.

Figure 10:
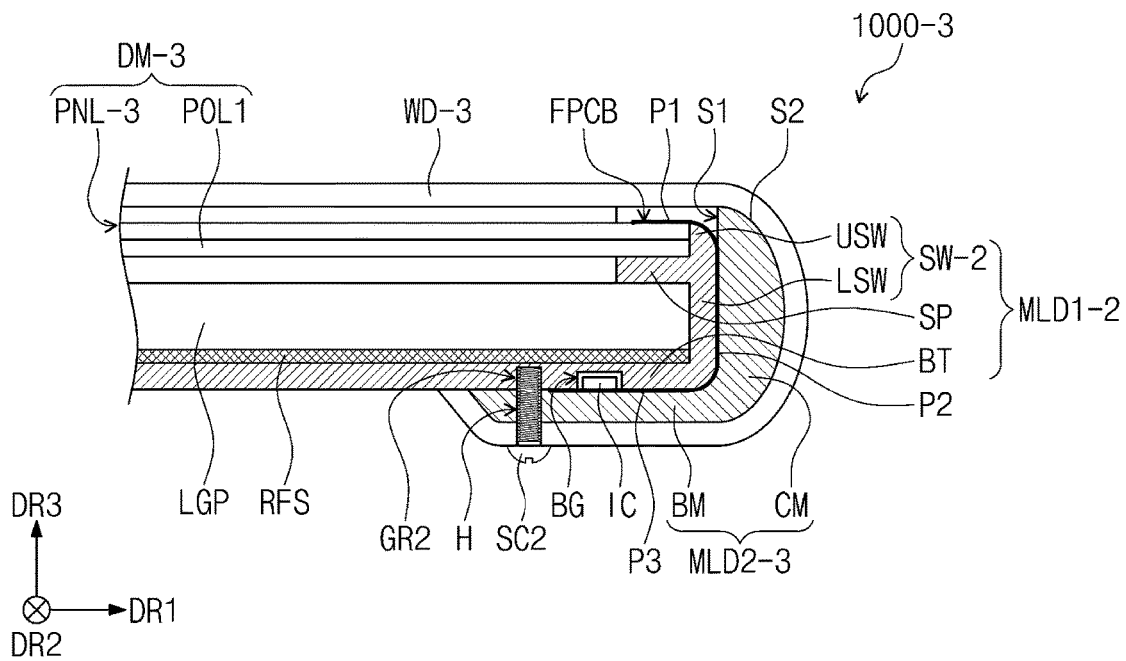
FIG. 10 is a cross-sectional view illustrating a display apparatus according to an exemplary embodiment of the present inventive concepts.
Figure 11:
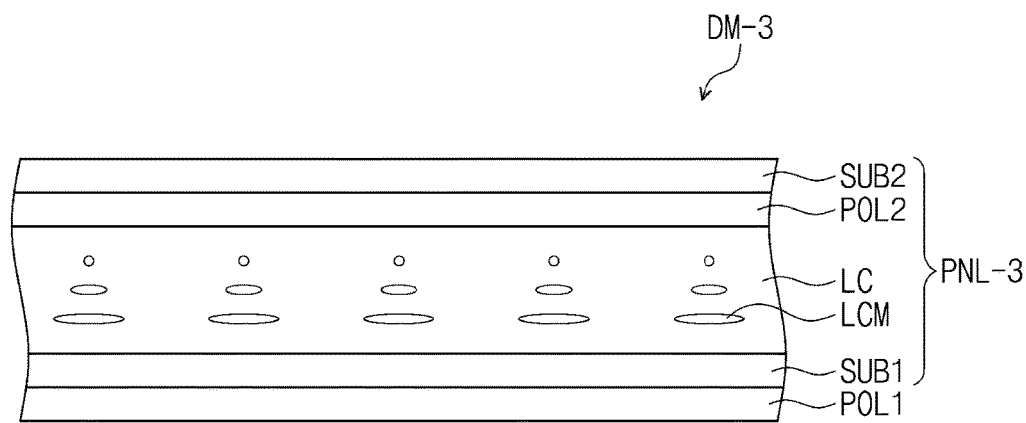
FIG. 11 is an enlarged cross-sectional view illustrating a display module of FIG. 10.

FIG. 10 is a cross-sectional view illustrating a display apparatus according to an exemplary embodiment of the present inventive concepts, and FIG. 11 is an enlarged cross-sectional view illustrating a display module of FIG. 10.

For the purpose of ease and convenience in description, differences between the present embodiment and the above embodiments will be mainly described and the same descriptions as in the above embodiments will be omitted. It is to be understood that the elements for which a detailed description has been omitted may be at least similar to corresponding elements that have already been described. In addition, the same components as described above may be indicated by the same reference designators.

Referring to FIG. 10, in a display apparatus 1000-3, according an exemplary embodiment of the present inventive concept, a length of a cover member WD-3 in the first direction DR1 may be greater than a length of a display module DM-3 in the first direction DR1. For example, the cover member WD-3 may be a window WD-3.

In detail, the cover member WD-3 may include a first cover portion and a second cover portion. The first cover portion and the second cover portion may be adjacent to each other in the first direction DR1. The first cover portion may be disposed on the display module DM-3 to cover the display module DM-3. The second cover portion may be bent downward along the outer side surface (e.g., the second surface S2) of the cover mold CM. For example, the second cover portion may be the light blocking portion CA. The second cover portion may cover the second surface S2 of the cover mold CM and a bottom surface of the bottom mold BM.

The display apparatus 1000-3, according to an exemplary embodiment of the present inventive concept, may further include a second connection member SC2 which fixes the cover member WD-3, the second mold MLD2-3, and the first mold MLD1-2. For example, the second connection member SC2 may be a screw. However, the present invention is, not limited by the kind of the second connection member SC2.

According to an exemplary embodiment of the present inventive concept, a second connection recess GR2 may be defined in the bottom portion BT of the first mold MLD1-2. The second connection recess GR may be recessed from the bottom surface of the bottom portion BT in the upward direction. The second connection member SC2 may penetrate the cover member WD-3 and the bottom mold BM so as to be inserted in the second connection recess GR2.

According to an exemplary embodiment of the present inventive concept, the cover member WD-3 may cover the housing HS (see FIG. 1), and thus a step difference which may be formed at an outer circumferential surface of the display apparatus 1000-3 may be removed or prevented. As a result, the display apparatus 1000-3 may be made more durable and/or aesthetically pleasing.

Referring to FIG. 11, the second polarizing layer POL2 of the display module DM-3, according to an exemplary embodiment of the present inventive concept, may be disposed between the liquid crystal layer LC and the second substrate SUB2. For example, a display panel PNL-3 may include the second polarizing layer POL2.

According to an exemplary embodiment of the present inventive concept, the second polarizing layer POL2 may be a wire grid polarizer. The second polarizing layer POL2 may include a plurality of nano-wires formed of a metal material. However, the present invention is not limited by the shape and the material of the second polarizing layer POL2.

Figure 12:
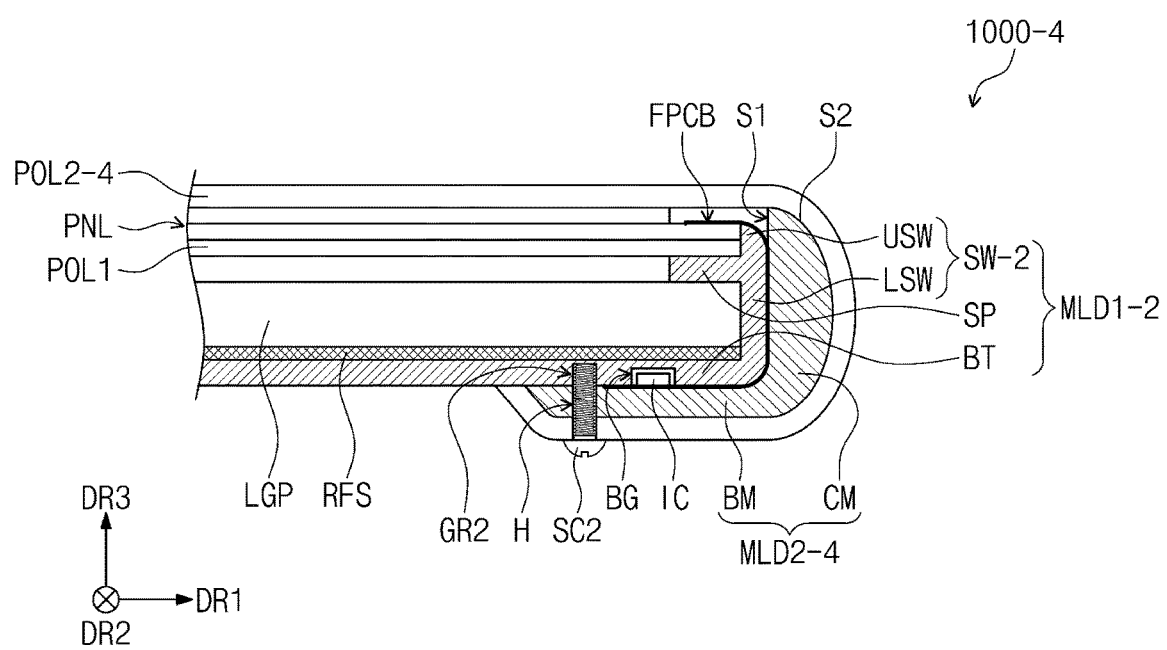
FIG. 12 is a cross-sectional view illustrating a display apparatus according to an exemplary embodiment of the present inventive concepts.

FIG. 12 is a cross-sectional view illustrating a display apparatus according to an exemplary embodiment of the present inventive concepts.

For the purpose of ease and convenience in description, differences between the present embodiment and the above embodiments will be mainly described and the same descriptions as in the above embodiments will be omitted. It is to be understood that the elements for which a detailed description has been omitted may be at least similar to corresponding elements that have already been described. In addition, the same components as described above will be indicated by the same reference designators.

Referring to FIG. 12, a display apparatus 1000-4, according to exemplary embodiments of the present inventive concept, might not include the window WD of FIG. 4. For example, the window WD of FIG. 4 may be omitted. In this case, a cover member POL2-4 may be the second polarizing layer.

A kind and/or a material of the cover member POL2-4 may be the same as that (or those) of the second polarizing layer, and other features (e.g., a shape and/or a position) of the cover member POL2-4 may be the same as corresponding features of the cover member WD-3 described with reference to FIG. 10. Thus, detailed descriptions to the cover member POL2-4 are omitted and it may be assumed that the cover member POL2-4 is at least similar to other cover members that have already been describe herein.

Figure 13:
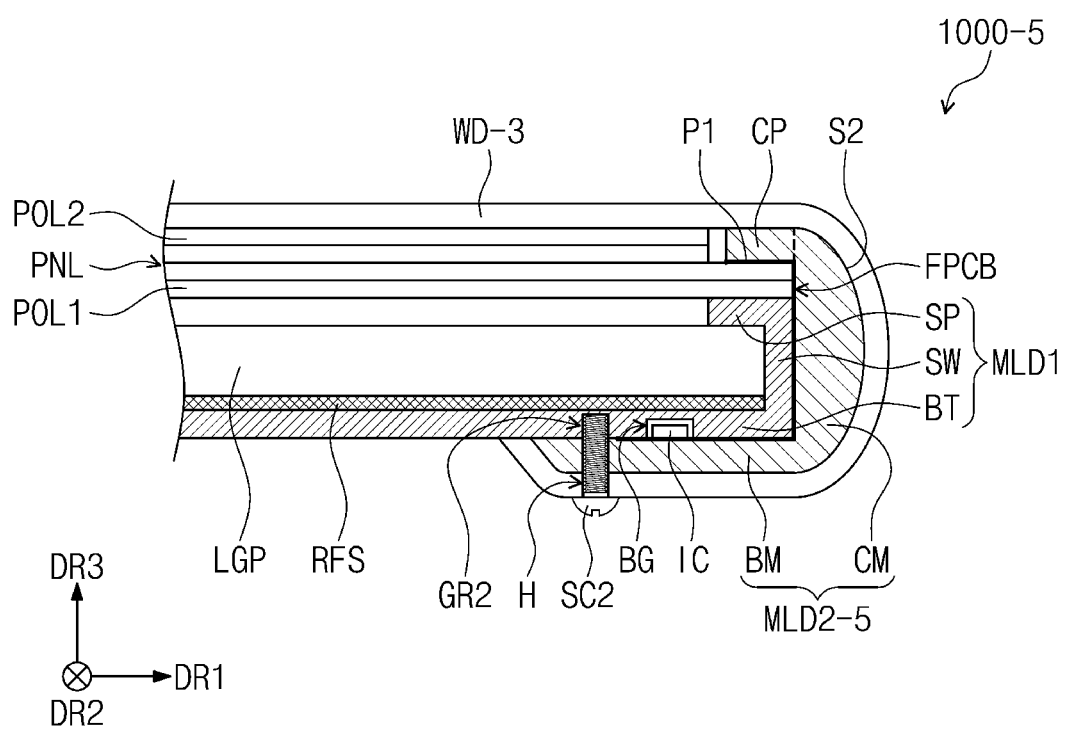
FIG. 13 is a cross-sectional view illustrating a display apparatus according to an exemplary embodiment of the present inventive concepts.

FIG. 13 is a cross-sectional view illustrating a display apparatus according to an exemplary embodiment of the present inventive concepts.

For the purpose of ease and convenience in description, differences between the present embodiment and the above embodiments will be mainly described and the same descriptions as in the above embodiments will be omitted. It is to be understood that the elements for which a detailed description has been omitted may be at least similar to corresponding elements that have already been described. In addition, the same components as described above will be indicated by the same reference designators.

Referring to FIG. 13, a second mold MLD2-5 of a display apparatus 1000-5, according to exemplary embodiments of the present inventive concept, may further include a step-difference compensation portion CP. The step-difference compensation portion CP may extend from a top end of the cover mold CM in a direction toward the inside of the display apparatus 1000-5. The step-difference compensation portion CP may be parallel to the top surface of the bottom mold BM.

The step-difference compensation portion CP may be disposed on the pad area PD (see FIG. 1) of the display panel PNL. For example, the step-difference compensation portion CP may be disposed on the first portion P1 of the flexible circuit board FPCB to at least partially cover the first portion P1.

A thickness of the step-difference compensation portion CP in the third direction DR3 may be equal to the shortest distance between a top surface of the first portion P1 and a bottom surface of the cover member WD-3 overlapping with the pad area PD. The cover member WD-3 may be the same as the cover member WD-3 of FIG. 10, and thus detailed descriptions thereto are omitted.

According to exemplary embodiments of the present inventive concept, the step-difference compensation portion CP may compensate a step difference which may occur between the top surface of the flexible circuit board FPCB and the cover member WD-3. For example, the cover member W D-3 may be supported by the step-difference compensation portion CP. Thus, a step difference which may be formed at an outer circumferential surface of the display apparatus 1000-5 may be effectively prevented.

Accordingly, the display apparatus may be made more durable.

While exemplary embodiments of the inventive concepts have been described herein with reference to the drawings, it will be apparent to those skilled in the art that various changes and modifications may be made without departing from the spirits and scopes of the inventive concepts.

What is claimed is:
1. A display apparatus, comprising:
a display panel configured to display an image;
a first mold disposed under the display panel and comprising a plurality of sidewall portions;
a second mold disposed adjacent to one of the plurality of sidewall portions and coupled to the first mold; and
at least one flexible circuit board which is connected to the display panel and of which a portion is bent downward, the at least one flexible circuit board being disposed between the first mold and the second mold,
wherein the second mold comprises:
a bottom mold at least partially covering one edge area of a bottom surface of the first mold; and
a cover mold bent upward from the bottom mold to cover the one sidewall portion,
wherein a first distance between an inner side surface of the cover mold and an outer side surface of the one sidewall portion of the plurality of sidewall portions is substantially constant across an entirety thereof.

2. The display apparatus of claim 1, wherein an outer side surface of the cover mold has a round shape.

3. The display apparatus of claim 2, wherein the inner side surface of the cover mold is parallel to the outer side surface of the one sidewall portion of the plurality of sidewall portions.

4. The display apparatus of claim 3, wherein the inner side surface of the cover mold includes a flat surface.

5. The display apparatus of claim 1, wherein the first distance is about 0.5 mm or less.

6. The display apparatus of claim 1, wherein the first mold further comprises:
a support portion which has a frame shape and on which the display panel is disposed; and
a bottom portion which is disposed under the support portion to define the bottom surface of the first mold, wherein the bottom is connected to the support portion through the plurality of sidewall portions.

7. The display apparatus of claim 6, wherein the flexible circuit board comprises:
a first portion connected to the display panel;
a second portion which is adjacent to the first portion and is bent downward to be disposed on the outer side surface of the one sidewall portion of the plurality of sidewall portions; and
a third portion bent from the second portion so as to be parallel to the first portion,
wherein the third portion is disposed between the bottom mold and the bottom portion of the first mold.

8. The display apparatus of claim 7, wherein a second distance between a top surface of the bottom mold and the bottom portion of the first mold is substantially constant across an entirety thereof.

9. The display apparatus of claim 8, wherein the second distance is about 0.5 mm or less.

10. The display apparatus of claim 8, wherein the first distance is equal to the second distance.

11. The display apparatus of claim 7, further comprising:
a driving chip mounted on the flexible circuit board and comprising at least one driving element configured to drive the display panel.

12. The display apparatus of claim 11, wherein an insertion recess is recessed inwardly from one of the outer side surface of the one sidewall portion of the plurality of sidewall portions and a bottom surface of the bottom portion of the first mold, and the driving chip is disposed within the insertion recess.

13. The display apparatus of claim 12, wherein the driving chip is disposed on the third portion of the flexible circuit board, and wherein the insertion recess is recessed inwardly from the bottom surface of the bottom portion.

14. The display apparatus of claim 7, wherein the second mold further comprises:
a step-difference compensation portion extending from an upper portion of the cover mold in a direction parallel to the bottom mold,
wherein the step-difference compensation portion is disposed on the first portion of tote flexible circuit board.

15. The display apparatus of claim 14, wherein a thickness of the step-difference compensation portion is equal to the shortest distance between a top surface of the first portion of the flexible circuit board and a bottom surface of a cover member disposed on the display panel.

16. The display apparatus of claim 7, wherein each of the plurality of sidewall portions comprises:
a lower sidewall portion bent downward from an outer side of the support portion so as to be connected to the bottom portion; and
an upper sidewall portion bent upward from the outer side of the support portion to cover a portion of a side surface of the display panel.

17. The display apparatus of claim 16, wherein each of the plurality of sidewall portions has curved surfaces defined in areas adjacent to bent areas of the flexible circuit board.

18. The display apparatus of claim 1, further comprising:
at least one first connection member coupling the first mold and the second mold to each other.

19. The display apparatus of claim 18, wherein at least one first connection recess is defined at the inner side surface of the cover mold, and the first connection member is disposed within the first connection recess.

20. The display apparatus of claim 18, wherein the first connection member is a screw.

21. The display apparatus of claim 18, wherein the first connection member is provided in plural,
wherein the plurality of first connection members are spaced apart from each other on the one sidewall portion of the plurality of sidewall portions, and
wherein the flexible circuit board is disposed between the plurality of first connection members.

22. The display apparatus of claim 1, wherein the second mold is provided in plural, and
wherein the plurality of second molds are disposed adjacent to the plurality of sidewall portions of the first mold in one-to-one correspondence and are coupled to the first mold.

23. The display apparatus of claim 1, further comprising:
a cover member disposed on the display panel,
wherein a top surface of the cover member is connected to an outer side surface of the cover mold.

24. The display apparatus of claim 1, further comprising:
a cover member of which at least a portion is disposed on the display panel,
wherein another portion of the cover member is bent downward to cover an outer side surface of the cover mold and a bottom surface of the bottom mold.

25. The display apparatus of claim 24, wherein the cover member is a window.

26. The display apparatus of claim 24, wherein the cover member includes a polarizing layer.

27. The display apparatus of claim 24, further comprising:
a second connection member fixing the cover member to the bottom mold.

28. The display apparatus of claim 27, wherein the second connection member at least partially penetrates the cover member and the bottom mold so as to be disposed within a second connection recess defined in the first mold.

29. The display apparatus of claim 1, wherein the first mold and the second mold include a same material.

30. The display apparatus of claim 1, wherein the first mold includes a plastic material.

31. The display apparatus of claim 1, wherein the second mold includes a metal material.

32. The display apparatus of claim 1, further comprising:
a backlight unit disposed under the display panel, to the backlight being configured to provide light to the display panel,
wherein the backlight unit is received in the first mold.

33. A display apparatus, comprising:
a display panel configured to display an image;
at least one flexible circuit board connected to the display panel;
a backlight unit disposed under the display panel;
a first mold accommodating the backlight unit; and
a second mold disposed adjacent to at least one outer side surface of the first mold,
wherein at least a portion of the flexible circuit board is bent downward and is disposed between the at least one outer side surface of the first mold and an inner side surface of the second mold which faces the at least one outer side surface the first mold, and
wherein a distance between the at least one outer side surface of the first mold and the inner side surface of the second mold is substantially constant across an entirety thereof.

34. A display apparatus, comprising:
a display panel configured to display an image;
a first mold disposed under the display panel and comprising a plurality of sidewall portions, wherein the display panel is seated on the first mold;
at least one flexible circuit board which is connected to the display panel and of which a portion is bent downward to at least partially surround one of the plurality of sidewall portions; and
a second mold disposed outside of the first mold and coupled to the first mold with the flexible circuit board interposed therebetween,
wherein the second mold comprises:
a first surface facing an outer side surface of the one of the plurality of sidewall portions and being parallel to the outer side surface; and
a second surface having a round shape which is outwardly convex.

* * * * *